(12) United States Patent
Sparks et al.

(10) Patent No.: US 10,047,514 B2
(45) Date of Patent: Aug. 14, 2018

(54) PORTABLE BUILDING

(71) Applicant: G-POD Pty Ltd, Peregian Beach (AU)

(72) Inventors: Dan Sparks, Peregian Beach (AU); Roger Hill, Kenmore (AU)

(73) Assignee: G-POD Pty Ltd, Peregian Beach, Queensland (AU)

( * ) Notice: Subject to any disclaimer, the term of this patent is extended or adjusted under 35 U.S.C. 154(b) by 0 days.

(21) Appl. No.: 15/309,565

(22) PCT Filed: May 8, 2015

(86) PCT No.: PCT/AU2015/050227
§ 371 (c)(1),
(2) Date: Nov. 8, 2016

(87) PCT Pub. No.: WO2015/168747
PCT Pub. Date: Nov. 12, 2015

(65) Prior Publication Data
US 2017/0183862 A1    Jun. 29, 2017

(30) Foreign Application Priority Data

May 8, 2014   (AU) ................................ 2014901702

(51) Int. Cl.
| | |
|---|---|
| *E04B 1/343* | (2006.01) |
| *E04B 1/348* | (2006.01) |
| *E04B 1/344* | (2006.01) |
| *E04H 1/00* | (2006.01) |
| *E04D 13/064* | (2006.01) |
| *E04B 1/68* | (2006.01) |
| *E04B 1/72* | (2006.01) |
| *E04B 1/35* | (2006.01) |

(Continued)

(52) U.S. Cl.
CPC .......... *E04B 1/34336* (2013.01); *E04B 1/344* (2013.01); *E04B 1/34352* (2013.01); *E04B 1/34357* (2013.01); *E04B 1/34807* (2013.01); *E04B 1/355* (2013.01); *E04B 1/68* (2013.01); *E04B 1/72* (2013.01); *E04D 13/064* (2013.01); *E04H 1/005* (2013.01); *E06B 3/32* (2013.01); *E06B 3/70* (2013.01); *H02S 20/23* (2014.12); *E04B 2001/34876* (2013.01); *E04B 2001/34892* (2013.01); *E04D 2013/0495* (2013.01); *E04H 2001/1283* (2013.01)

(58) Field of Classification Search
CPC .................................................. E04B 1/34384
See application file for complete search history.

(56) References Cited

U.S. PATENT DOCUMENTS 3,210,807 A  *  10/1965  Wallmann ............... E06L 33/50
                                                        49/249
3,768,855 A     10/1973  Laue
                  (Continued)

FOREIGN PATENT DOCUMENTS

CA        2891004 A1 *  6/2014   ......... E04B 1/34305
WO    2009/124358 A1    10/2009

*Primary Examiner* — Babajide A Demuren
(74) *Attorney, Agent, or Firm* — Dilworth & Barrese, LLP

(57) ABSTRACT

A portable building, the portable building including: a body having at least one wall that is adapted to move from a substantially vertical position to a second position; and at least one slideout portion that slides outwardly from the body. The body is substantially the size of an ISO shipping container in a transport configuration.

12 Claims, 3 Drawing Sheets

(51) Int. Cl.
*E06B 3/70* (2006.01)
*E06B 3/32* (2006.01)
*H02S 20/23* (2014.01)
*E04H 1/12* (2006.01)
*E04D 13/04* (2006.01)

(56) References Cited

U.S. PATENT DOCUMENTS

| | | | | |
|---|---|---|---|---|
| 5,960,593 | A * | 10/1999 | Murphy | E04L 31/3442 |
| | | | | 52/143 |
| 8,720,125 | B2 * | 5/2014 | Andretich | F24J 2/5264 |
| | | | | 296/171 |
| 2007/0209294 | A1 | 9/2007 | Harvey | |
| 2010/0024314 | A1 | 2/2010 | Pope | |
| 2012/0006369 | A1 | 1/2012 | Cantin et al. | |
| 2012/0151851 | A1 * | 6/2012 | Cantin | E04B 1/34305 |
| | | | | 52/79.5 |
| 2016/0059105 | A1 * | 3/2016 | Scade Garcia | A63B 71/02 |
| | | | | 52/69 |

* cited by examiner

PORTABLE BUILDING

FIELD OF THE INVENTION

The invention relates to a portable building. In particular, the invention relates, but is not limited, to a portable building constructed to resemble a shipping container in a transport configuration.

BACKGROUND TO THE INVENTION

Reference to background art herein is not to be construed as an admission that such art constitutes common general knowledge in Australia or elsewhere.

A portable building is designed and built to be movable. Portable buildings have become popular for living and work accommodation in remote or sensitive environments in addition to urban, sub-urban and rural areas.

As portable buildings are typically designed to be moved, floor space is limited to allow for transportation. Limited floor space reduces user comfort and the function of the portable building. On the other hand, if floor space is increased, typically further measures need to be taken to move the portable building. For example, larger trucks and cranes may be needed to move the portable building. Furthermore, transportation by rail, sea and/or air may not be appropriate or cost effective.

In addition, once deployed, adding structures to increase the floor space of the portable building is typically time consuming and costly. Furthermore, these additional structures, which are typically not readily moveable, increase deconstruction time for the portable building when it is to be moved to a new area. This extended deconstruction time may prevent the portable building being moved to safety in certain situations (i.e. a flood).

OBJECT OF THE INVENTION

It is an aim of this invention to provide a portable building which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a portable building, the portable building including:
  a body having:
    at least one wall that is adapted to move from a substantially vertical position to a second position; and
    at least one slideout portion that slides outwardly from the body.

Preferably, the second position is transverse to the vertical position. Preferably, the second position is substantially horizontal. Preferably, the second position is in a range of approximately 30 to 60 degrees to a horizontal plane.

Preferably, the body includes a top wall, a bottom wall, two side walls and/or two end walls. Normally, the body is rectangular in shape in a transport configuration. Typically, in the transport configuration, the at least one wall is in the substantially vertical position and the slideout portion is located substantially within part of the body. Normally, the body is in the form of a shipping container in the transport configuration. Preferably, the body adheres to ISO shipping container standards in the transport configuration.

Typically, the at least one wall that is adapted to move from the substantially vertical position to the substantially horizontal position is at least one of the side walls and/or at least one of the end walls. Normally, one of the side walls is adapted to move from the substantially vertical position to the substantially horizontal position.

Preferably, a biasing member biases the at least one wall to the substantially vertical position. Alternatively, the biasing member biases the at least one wall to the substantially horizontal position. Preferably, the biasing member includes a spring. Preferably, the spring is in the form of a spring stack. Preferably, the biasing member includes a gear assembly. Preferably, the gear assembly interacts with the spring and prevents over rotation of the at least one wall. Preferably, gear assembly confines rotation of the at least one wall to approximately 90 degrees. In a further form, the biasing member is in the form of a torsion spring.

Typically, the bias applied by the biasing member can by overcome by a force from a user. Preferably, moving the at least one wall from the substantially vertical position past a predetermined position overcomes the bias from the biasing member and allows the at least one wall to continue moving to the substantially horizontal position. Preferably, movement of the at least one wall is automated by a controller.

Preferably, the end walls each include two doors that rotate about an axis that is substantially perpendicular with the ground surface. Preferably, the doors forming part of the end walls are configured to rotate from a first closed position to a second open position.

Preferably, the at least one slideout portion slides with the assistance of rollers. Preferably, the at least one slideout portion includes one, two, three or four slideout portions sliding in different directions. Preferably, the at least one slideout portion slides from a first position to a second position.

Preferably, in the first position, the slideout portion is located substantially between the top wall and the bottom wall. Preferably, in the second position, the slideout portion extends beyond the top wall and/or the bottom wall. Normally, at least one slideout portion slides along a lateral axis. Typically, the lateral axis extends between the side walls. Preferably, at least one slideout portion slides along a longitudinal axis. Preferably, the longitudinal axis extends between the end walls.

Preferably, the at least one slideout portion slides away from the at least one wall. Preferably, the at least one slideout portion that slides away from the at least one wall slides along the longitudinal axis or the lateral axis. Preferably, the at least one slideout portion includes two slideout portions where one slideout portion slides along a longitudinal axis away from the at least one wall and another slideout portion slide along a lateral axis away from the at least one wall.

Preferably, the at least one slideout portion slides towards the at least one wall. Preferably, the at least one slideout portion that slides towards the at least one wall slides along the lateral axis. Preferably, the at least one slideout portion includes two slideout portions where one slideout portion slides towards the at least one wall and another slideout portion slides away from the at least one wall.

Preferably, one slideout portion slides at least part of one of the side walls and/or at least part of one of the end walls from the first position to the second position. Alternatively, or additionally, one slideout portion slides out of at least one of the side walls and/or at least one of the end walls.

Normally, the at least one slideout portion that slides along the lateral axis is configured to overlap with the at least one slideout portion that slides along the longitudinal axis, or vice versa. For example, the slideout portion sliding from one of the side walls is configured to overlap with the slideout portion sliding from one of the end walls.

Preferably, sliding of the at least one slideout portion is automated by a controller.

Preferably, the portable building includes a secondary door. Preferably, the secondary door is located adjacent to the substantially vertical position of the at least one wall. Alternatively, the secondary door is fitted at the initial vertical position of the at least one wall when the at least one wall is moved to the substantially horizontal position. Preferably, the secondary door is configured to move across the at least one wall. Normally, the secondary door is a folding door.

Preferably, the portable building further includes footings. Normally, the footings are adjustable. Preferably, footings are located at or near the respective corners of the body. For example, footings are located at or near connections between the side walls and the end walls. Normally, footings are located on an outer edge of the at least one wall, when the at least one wall is moved to the substantially horizontal position.

Preferably, the portable building further includes a cover. Typically, the cover covers the at least one wall when it moves to the substantially horizontal position. Preferably, the portable building further includes steps. Preferably, the steps are connected to the at least one wall when it moves to the substantially horizontal position.

Preferably, the portable building further includes a solar panel. Preferably, the solar panel provides electricity to the portable building. Normally, the portable building includes a rainwater capture system. Typically, the water capture system includes a water tank and a gutter system.

Preferably, the portable building includes a kitchen portion, a bathroom portion, a storage portion and/or a sleeping portion.

In another form the invention resides in a method for assembling a portable building, the method including the steps of:
  moving one or more walls of a body from a substantially vertical position to a second position; and
  sliding one or more slideout portions outwardly from at least part of the body.

Preferably, the second position is transverse to the vertical position. Preferably, the second position is substantially horizontal. Preferably, the second position is in a range of approximately 30 to 60 degrees to a horizontal plane.

Preferably, the step of sliding the one or more slideout portions outwardly from at least part of the body includes sliding the one or more slideout portions along a longitudinal or lateral axis of the body.

Preferably, the step of sliding the one or more slideout portions outwardly from at least part of the body includes sliding the one or more slideout portions towards the one or more walls.

Preferably, the step of sliding the one or more slideout portions outwardly from at least part of the body includes sliding the one or more slideout portions away from the one or more walls.

Preferably, the method further includes the step of constructing a door across the wall. Preferably, the method includes moving the door to a open or closed position, when the wall is moved to the substantially horizontal position.

Preferably, the method further includes the step of opening a door of an end wall before the slide out portion slides from part of the body.

Preferably, the method further includes the step of constructing a cover above the wall when it has moved to the substantially horizontal position.

Preferably, the method further includes the step of connecting steps to the wall when it has moved to the substantially horizontal position.

Preferably, the method further includes adjusting footings to level the building.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
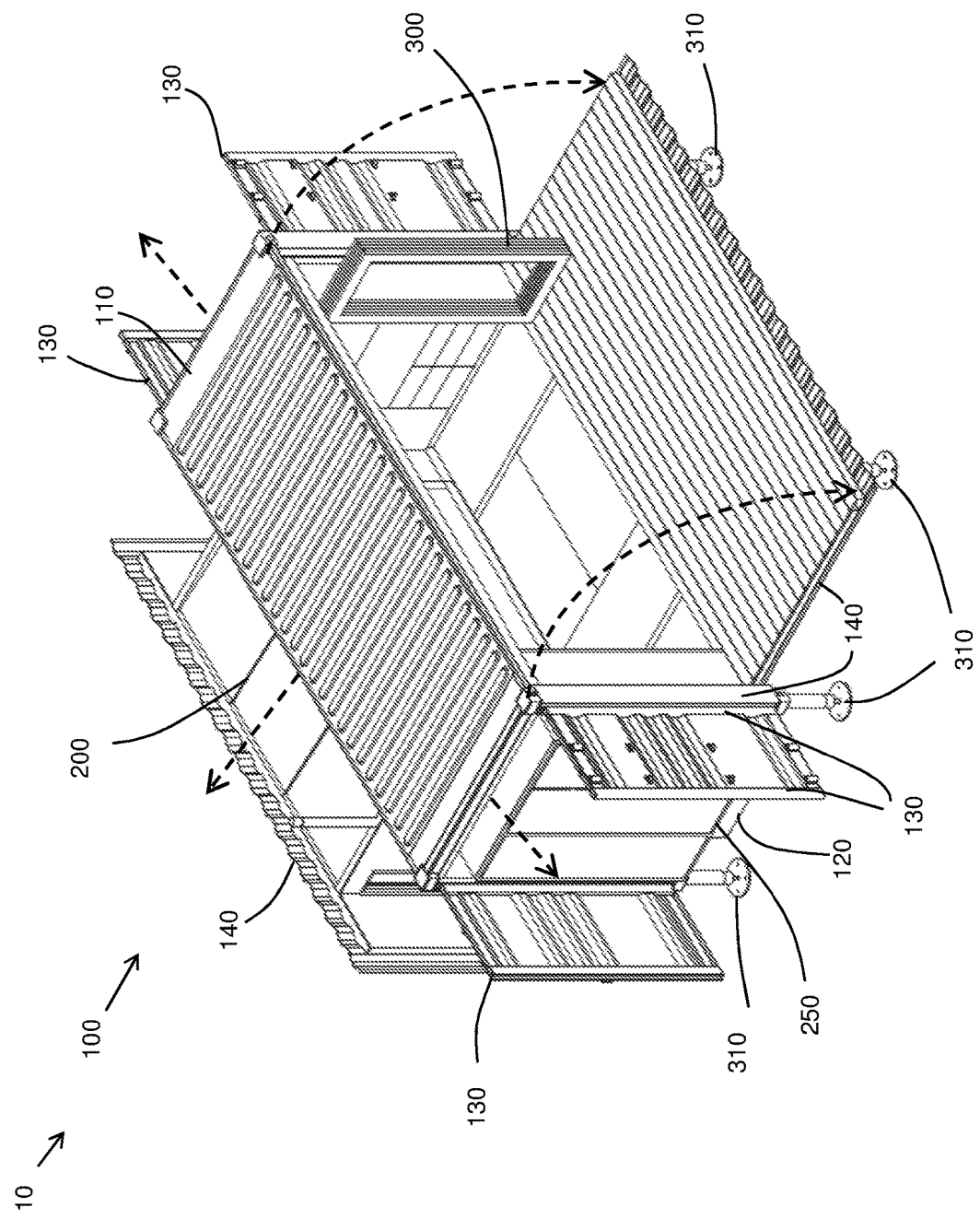
FIG. 1 illustrates a portable building according to an embodiment of the invention.

FIG. 1 illustrates a portable building 10 according to an embodiment of the invention. The portable building 10 includes a body 100 having one wall that is adapted to move from a substantially vertical position to a second position; and slideout portions 200, 250 that slide outwardly from at least part of the body 100 and away from the one wall.

The body 100 includes a top wall 110 and a bottom wall 120. The top wall 110 and bottom wall are connected together by two end walls 130 and two side walls 140, in part. The two side walls 140 are longer than the two end walls 130.

The two end walls 130 each include two doors that are configured to rotate about an axis substantially perpendicular to a ground plane. The two doors are able to be locked together for transportation. It would be appreciated by a person skilled in the art that the doors may be removed, if required.

Part of one side wall 140 forms the one wall that is configured to move from the substantially vertical position to the second position. In this embodiment, the side wall 140 moves by rotating to a second position that is substantially horizontal. However, it would be appreciated that in further embodiments that the side wall 140 may move with a range of, for example, 30 to 60 degrees from a horizontal plane. These positions are transverse to the vertical position.

The side wall 140 is connected to a biasing member 150, as discussed below. The biasing member 150 biases the side wall 140 to the vertical position. The biasing member 150 is not shown in FIGS. 1 and 2 but is discussed further below with reference to FIGS. 3 to 5.

The side wall also 140 includes a locking device to lock the side wall 140 in place whilst in the vertical position. Furthermore, in the vertical position, the side wide wall 140 forms part of a seal to keep the portable building 10 weatherproof.

Part of the other side wall 140 is connected to slideout portion 200. The slideout portion 200 is configured to be received between the top wall 110 and the bottom wall 120.

The slideout portion 200 slides from a first position to a second position. Rollers are used to assist in sliding the slideout portion 200. In this embodiment, the slideout portion 200 slides away from the side wall 140 that is configured to move from the substantially vertical position to the second position. In other embodiments, it will be appreciated that the slideout portion 200 may slide towards the side wall 140 that is configured to move from the substantially vertical position to the second position. In this further embodiment, the slideout portion 200 follows the side wall 140.

In the first position, the slideout portion 200 is located between the top wall 110 and the bottom wall 120. In the second position, the slideout portion 200 substantially extends beyond the top wall 110 and the bottom wall 120. When the slideout portion 200 is in the first position, the side wall 140 seals part of the body 100. When the slideout portion 200 is in the second position, the slideout portion 200 seals part of the body 100. In either the first position or the second position, the portable building 10 remains weatherproof by the seals.

Further slideout portions 250 are located adjacent each end wall 130. As with slideout portion 200, slide out portions 250 are configured to be received between the top wall 110 and the bottom wall 120.

The slideout portions 250 slide from a first position to a second position. The slideout portions 250 slide away from the side wall 140 that is configured to move from the substantially vertical position to the second position. Rollers are used to assist in sliding the slideout portions 250.

Similar to above, in the first position, the slideout portion 250 is located between the top wall 110 and the bottom wall 120. In the second position, the slideout portion 250 substantially extends beyond the top wall 110 and/or the bottom wall 120. When each slideout portion 250 is in the first position, it is located behind the closed doors of the end walls 130, respectively. When the slideout portions 250 are in the second position, they extend through part of the end walls 130, respectively.

The portable building 10 also includes a (secondary) door 300. The secondary door 300 is located adjacent the side wall 140 that forms the at least one wall that is configured to move from the substantially vertical position to the substantially horizontal position. The secondary door 300 is either a folding, stacking or sliding door and/or window. The secondary door 300 may also include a flyscreen. In this embodiment, the secondary door 300 is configured to open and close across part of the side wall 140.

The portable building 10 also includes footings 310. Footings 310 are located on the corners of the body 100. That is, footings 310 are located at connections between the end walls 130 and the side wall 140. Footings 310 are also located at or near an outer portion of the side wall 140 when it rotates to the substantially horizontal position. The footings 310 are adjustable for variations in a ground surface.

The portable building 10 also includes a kitchen portion, a bathroom portion, a storage portion and/or a sleeping portion. The kitchen portion, bathroom portion, storage portion and/or sleeping portion may form part of the slideout portions 200,250.

Figure 2:
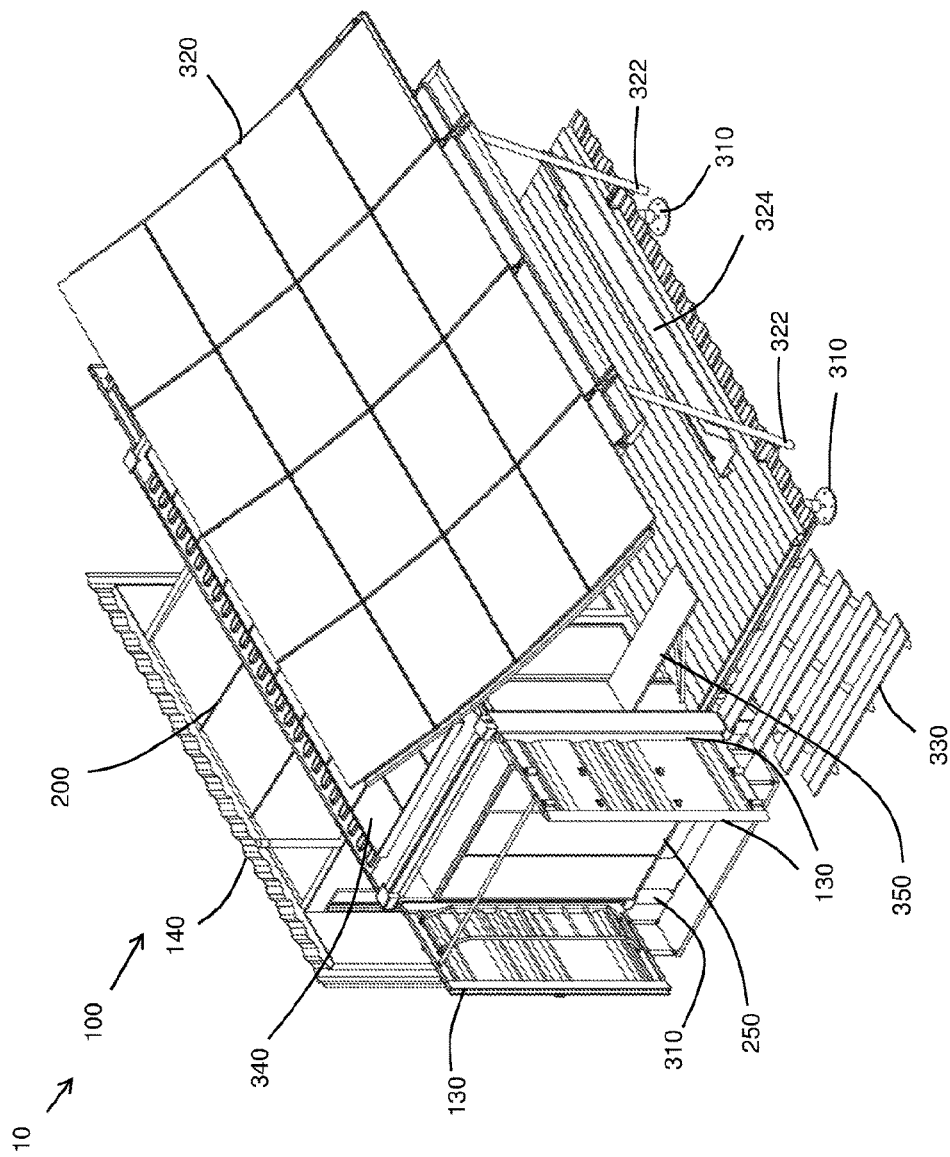
FIG. 2 illustrates the portable building illustrated in FIG. 1 with additional features.

FIG. 2 illustrates the portable building 10 illustrated in FIG. 1 with additional features including a cover 320, cover supports 322, seat 324, stairs 330, solar panels 340, bench 350 and a rainwater capture system (not shown).

The cover 320 covers the side wall 140 when it has moved to its substantially horizontal position. The cover is supported by the cover supports 322 that are connected to the side wall 140. The cover supports 322 also support the seat 324. The stairs 330 are also connected to the side wall 140 when it has moved to its substantially horizontal position.

The solar panels 340 are located on top of the top wall 110. The solar panels 340 provide electricity to the portable building 10. The rainwater capture system includes a water tank and a gutter system. The gutter system is designed to take water from at least the top wall 110 and/or cover 322 to the water tank.

Figure 3:
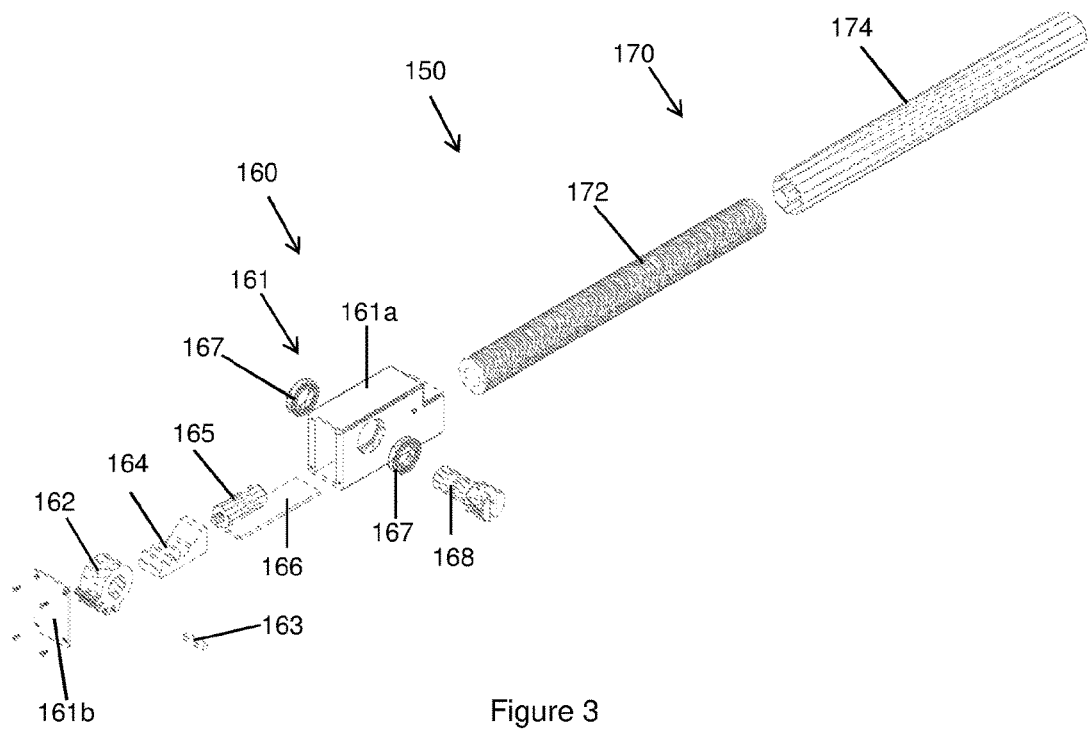
FIG. 3 illustrates an exploded view of a biasing member of the portable building according to an embodiment of the invention.

FIG. 3 illustrates an exploded view of a biasing member 150 of the portable building 10 according to an embodiment of the invention.

The biasing member 150 includes a gear assembly 160 and a spring assembly 170. The gear assembly 160 includes a housing 161 having a body 161a and a cover plate 161b. The housing 161 houses a gear 162. The gear 162 is connected to the housing 161 via an axle 168 that is supported by bearings 167. A key 163 assists in holding the axle 168 in place. The axle allows the biasing member 150 to pivot relative to the body 100. The gear 162 engages a rack 164. The rack 164 is connected to a pushrod 165 and moves along a bearing plate 166. The pushrod is connected to the spring assembly 170.

The spring assembly 170 includes a spring stack 172. The spring stack 172 includes a plurality of spring discs. The spring stack is housed in a spring housing 174.

Figure 4:
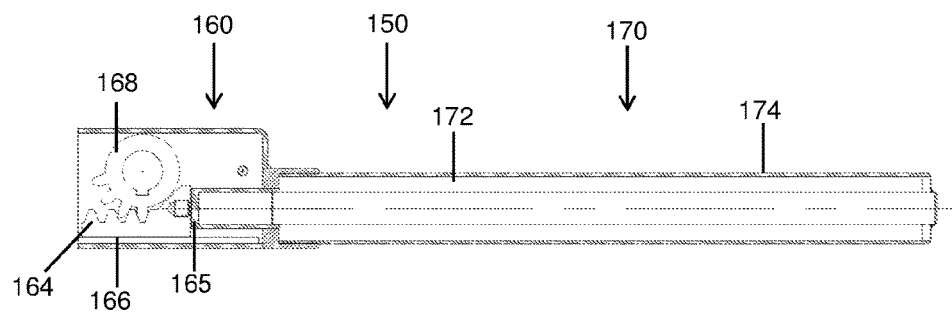
FIG. 4 illustrates the biasing member in FIG. 3 in an associated closed position according to an embodiment of the invention.

FIG. 4 illustrates the biasing member 150 in an associated closed position according to an embodiment of the invention. That is, FIG. 4 illustrates the position of the biasing member 150 when the one wall 140 is in the substantially vertical position. The spring stack 172 assist in maintaining the one wall 140 in the substantially vertical position.

Figure 5:
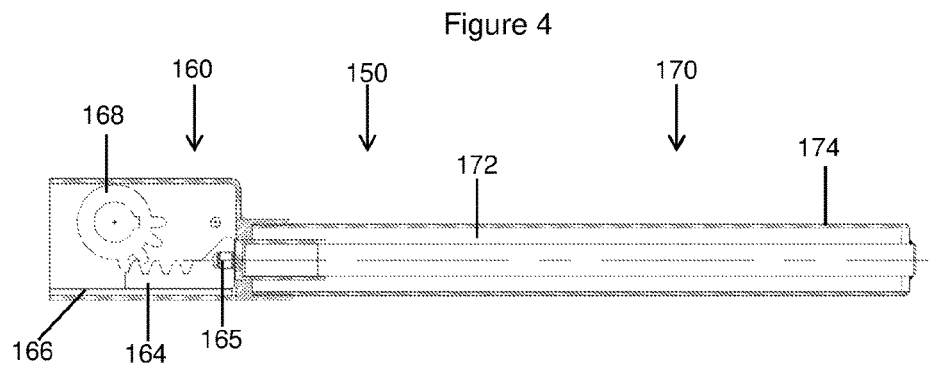
FIG. 5 illustrates the biasing member in FIG. 4 in an associated open position according to an embodiment of the invention.

FIG. 5 illustrates the biasing member 150 in an associated open position according to an embodiment of the invention. That is, FIG. 5 illustrates the position of the biasing member 150 when the one wall 140 is in the substantially horizontal position. As can be seen in FIG. 5, the engagement of the rack 164 with the housing 161 prevents over rotation of the one wall 140 by confining rotation to approximately 90 degrees.

In a transportation configuration, the slideout portions 200, 250 are located in the first position and the side wall 140 is in the substantially vertical position. The doors of the end walls 130 are also closed. In the transport configuration the portable building 10 is substantially in the form of a shipping container.

In a deployed configuration, the side wall 140 is unlocked and moved from the vertical position to the horizontal position. This process may be automated. However, it would be appreciated by a person skilled in the art that this process may be manual. When the side wall 140 moves past a predetermined position, the bias from the biasing member 150 is overcome by the weight of the side wall 140 and, therefore, it is allowed to continue moving to the substantially horizontal position. The bias from the biasing member 150 assists, for example, when a user moves the side wall 140 back to the vertical position. The bias from the biasing member 150 also assists in preventing the side wall 140 from rapidly moving to the horizontal position, which may pose a safety risk.

In the deployed position, the slideout portions 200,250 also slide from the first position to the second position. This process may be automated in this embodiment. The slideout portion 200 slides along a lateral axis. The lateral axis extends between the side walls 140 in the transport configuration. The slideout portions 250 slide along a longitudinal axis. The longitudinal axis extends between the two end walls 130. The doors of the end walls 130 are opened before the slideout portions 250 slide along the longitudinal axis. In this regard, it would be appreciated that the slideout portions 200, 250 slide away form the side wall 140 that forms the one wall that is configured to move from the substantially vertical position to the substantially horizontal position.

To enclose or open part of the portable building 10 when the side wall 140 is moved to the substantially horizontal position, the secondary door 300 is moved to a closed or open position, respectively. To level the portable building 10, the footings 310 are adjusted.

Once in the deployed position, the additional features shown in FIG. 2 may be added to the portable building 10. For example, the cover 320 may be constructed over the side wall 140 in its substantially horizontal position. It would also be appreciated by a person skilled in the art that the additional features shown in FIG. 2 are stored in the portable building 10 in the transport configuration.

The portable building 10 provides a readily transportable living module that, once deployed, can extend its floor space to increase user comfort and the function of the portable building 10. Typically, the floor area can almost triple in the portable building between the transport configuration and the deployed configuration. The set up and dismantling time of the portable building 10 is also reduced compared to other buildings that add additional structures to increase floor space. Normally, the portable building 10 can be rapidly deployed or dismantled in a matter of hours whilst other portable buildings may take one or more days.

The additional features shown in FIG. 2 may also be added to the portable building 10 to increase its comfort and/or function. For example, as the portable building 10 may use solar energy and is equipped to capture and store rainwater, it can be located and occupied with minimal impact on the surrounding environment. Moreover, the portable building 10 may be used 'off the grid' without the need for mains electricity, water or sewage.

As the portable building 10 is also in the form of a standard ISO shipping container in the transport configuration, the portable building 10 can readily and easily be transported by rail, sea or air.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A portable building including:
a body having:
at least one wall positioned to move from a substantially vertical position to a second position;
at least one slideout portion positioned to slide outwardly from the body; and
a biasing member arranged to bias the at least one wall to the substantially vertical position, the biasing member comprising a gear assembly and a spring assembly, wherein
the gear assembly and the spring assembly are arranged to interact to prevent over rotation of the at least one wall,
the at least one wall is positioned to move from the substantially vertical position past a predetermined position to overcome the bias from the biasing member and continue to move to a substantially horizontal position,
the gear assembly comprises a gear rotatably mounted upon an axle and a rack engaged with both the gear and the spring assembly, and an outer housing encompassing both the gear and rack, with the rack positioned to slide along the housing, and
the rack and housing are engaged to confine maximum rotation of the at least one wall to approximately 90 degrees.

2. The portable building of claim 1, wherein the second position is transverse to the vertical position.

3. The portable building of claim 1, wherein the body is moveable between a transport configuration and a deployment configuration.

4. The portable building of claim 3, wherein in the transport configuration the at least one wall is in the substantially vertical position and the slideout portion is located substantially within part of the body.

5. The portable building of claim 3, wherein the body is substantially the size of a shipping container in the transport configuration.

6. The portable building of claim 1, wherein the at least one slideout portion includes two slideout portions where one slideout portion slides along a lateral axis of the body and is configured to overlap with another slideout portion that slides along a longitudinal axis of the body.

7. The portable building of claim 1, wherein a door is configured to move across the at least one wall.

8. The portable building of claim 1, further including a cover that covers the at least one wall when it moves to the substantially horizontal position.

9. The portable building of claim 1, wherein the body includes end walls having two doors that rotate about an axis that is substantially perpendicular with a ground surface.

10. The portable building of claim 1, wherein the spring assembly comprises a stack of spring discs, an outer housing encompassing said stack of spring discs, and a push rod at one end of the outer housing and engaged with the rack, and with said stack of spring discs arranged to maintain the at least one wall in substantially vertical position.

11. A portable building including:
a body having:
at least one wall positioned to move from a substantially vertical position to a second position;
at least one slideout portion positioned to slide outwardly from the body; and
a biasing member arranged to bias the at least one wall to the substantially vertical position, the biasing member comprising a gear assembly and a spring assembly, wherein
the gear assembly and the spring assembly are arranged to interact to prevent over rotation of the at least one wall, and
the at least one wall is positioned to move from the substantially vertical position past a predetermined position to overcome the bias from the biasing member and continue to move to a substantially horizontal position, and additionally comprising
a top wall and a bottom wall,
slidable portions positioned to slide out from opposite ends of said top and bottom walls and form walls positioned perpendicularly to one another,
with two such walls being two said movable walls positioned on opposite sides of said top and bottom walls upon sliding out, and
two such walls being end walls perpendicularly positioned to said two movable walls upon sliding out.

12. The portable building of claim 11, wherein said two end walls each comprise two doors configured to rotate about an axis substantially perpendicular to a ground plane and be locked together, and additionally comprising
a cover arranged to be supported upon one of said movable walls when rotated to said second position via supports.

* * * * *